(12) United States Patent
Yamamoto

(10) Patent No.: US 9,659,119 B2
(45) Date of Patent: May 23, 2017

(54) METHOD AND DESIGN APPARATUS

(71) Applicant: Socionext, Inc., Yokohama-shi, Kanagawa (JP)

(72) Inventor: Furuna Yamamoto, Kasugai (JP)

(73) Assignee: SOCIONEXT INC., Yokohama (JP)

( * ) Notice: Subject to any disclaimer, the term of this patent is extended or adjusted under 35 U.S.C. 154(b) by 11 days.

(21) Appl. No.: 14/629,910

(22) Filed: Feb. 24, 2015

(65) Prior Publication Data

US 2015/0278415 A1 Oct. 1, 2015

(30) Foreign Application Priority Data

Mar. 31, 2014 (JP) ................................ 2014-072422

(51) Int. Cl.
*G06F 9/455* (2006.01)
*G06F 17/50* (2006.01)

(52) U.S. Cl.
CPC ...... *G06F 17/5031* (2013.01); *G06F 2217/08* (2013.01); *G06F 2217/62* (2013.01); *G06F 2217/78* (2013.01); *G06F 2217/82* (2013.01); *G06F 2217/84* (2013.01)

(58) Field of Classification Search
USPC ........................................................ 716/113
See application file for complete search history.

(56) References Cited

U.S. PATENT DOCUMENTS 9,032,356 B2 * 5/2015 Monthie ................ H03K 5/135
716/106

FOREIGN PATENT DOCUMENTS

| JP | 2000-267752 | 9/2000 |
|---|---|---|
| JP | 2010-170321 | 8/2010 |
| WO | WO 00/65651 | 11/2000 |

OTHER PUBLICATIONS

Patent Abstracts of Japan, Publication No. 2000-267752, published Sep. 29, 2000.
Patent Abstracts of Japan, Publication No. 2010-170321, published Aug. 5, 2010.

* cited by examiner

*Primary Examiner* — Eric Lee
(74) *Attorney, Agent, or Firm* — Staas & Halsey LLP

(57) ABSTRACT

When a design apparatus adjusts clock skews, the design apparatus separates each of the power supply currents which flow through circuit sections that operate in synchronization with a clock signal into a plurality of frequency components, sets skew values of the clock signal which reaches the circuit sections, and performs, by changing the skew values, repetition of calculating a combined amplitude by combining, with respect to each of the frequency components, corresponding ones of the frequency components of the power supply currents which flow through the circuit sections and finds dependence of the combined amplitude on a skew.

9 Claims, 12 Drawing Sheets

T1 SINE WAVE FUNCTION TABLE

| FREQUENCY | f1 | f2 | f3 | ... | fj |
|---|---|---|---|---|---|
| CIRCUIT SECTION b1 | $A_{b1(f1)}\cos(\omega_1(t+t0_{b1}))$ | $A_{b1(f2)}\cos(\omega_2(t+t0_{b1}))$ | $A_{b1(f3)}\cos(\omega_3(t+t0_{b1}))$ | ... | $A_{b1(fj)}\cos(\omega_j(t+t0_{b1}))$ |
| CIRCUIT SECTION b2 | — | $A_{b2(f2)}\cos(\omega_1(t+t0_{b2}))$ | — | ... | $A_{b2(fj)}\cos(\omega_k(t+t0_{b2}))$ |
| CIRCUIT SECTION b3 | $A_{b3(f1)}\cos(\omega_3(t+t0_{b3}))$ | — | $A_{b3(f3)}\cos(\omega_4(t+t0_{b3}))$ | ... | $A_{b3(fj)}\cos(\omega_l(t+t0_{b3}))$ |
| CIRCUIT SECTION bn | — | — | $A_{bn(f3)}\cos(\omega_1(t+t0_{bn}))$ | ... | $A_{bn(fj)}\cos(\omega_m(t+t0_{bn}))$ |

FIG. 7

T2 CLOCK SKEW SETTING TABLE

|  | CLOCK SKEW APPLIED/ NON-APPLIED | MAXIMUM CLOCK SKEW VALUE | CLOCK SKEW SWEEP STEP |
|---|---|---|---|
| CIRCUIT SECTION b1 | APPLIED | 500ps | 50ps |
| CIRCUIT SECTION b2 | APPLIED | 350ps | 35ps |
| CIRCUIT SECTION b3 (PEAK OF POWER SUPPLY CURRENT IS LOW OR TIMING CONSTRAINT IS SEVERE) | NON-APPLIED | — | — |
| CIRCUIT SECTION bn | APPLIED | 100ps | 10ps |

FIG. 8

T3 — TARGET FREQUENCY SETTING TABLE

| x | fx | f |
|---|----|---|
| 0 | f0 | 30MHz |
| 1 | f1 | 60MHz |
| 2 | f2 | 90MHz |
| ⋮ | ⋮ | ⋮ |
| M | fM | fmax |

FIG. 9

T4 CLOCK SKEW SWEEP TABLE

| y | $t_{step}$ | ts |
|---|---|---|
| 0 | | 0ps |
| 1 | | 50ps |
| 2 | 50ps | 100ps |
| ⋮ | | |
| N | | $ts_{max}$ |

FIG. 10

METHOD AND DESIGN APPARATUS

CROSS-REFERENCE TO RELATED APPLICATION

This application is based upon and claims the benefit of priority of the prior Japanese Patent Application No. 2014-072422, filed on Mar. 31, 2014, the entire contents of which are incorporated herein by reference.

FIELD

The embodiments discussed herein are related to a design method and a design apparatus.

BACKGROUND

With the progress of transistor microfabrication processes, in recent years the operating frequencies of semiconductor integrated circuits have become higher and their sizes have become larger. In addition, currents which flow between power supplies and ground have become stronger and have made a sudden change. In these situations the influence of noise (such as simultaneous switching noise or radiation noise) caused by such currents is significant and effective measures to reduce noise are sought.

One of measures to reduce noise is a method for designing a clock tree so as to disperse clock skews in circuit sections in a semiconductor integrated circuit (skew dispersion method).

With the skew dispersion method, skews are produced for clock signals to be supplied to circuit sections to intentionally stagger times at which the clock signals reach the circuit sections and to disperse times at which the circuit sections operate. By going so, a current peak is lowered and noise is reduced.

The technique of extracting delay information from cell placement and routing information and increasing skews in a tolerance range of skew values calculated on the basis of the delay information was formerly proposed. With this technique, skew values for lowering the peak of a combined current obtained by combining on a time axis currents which flow through circuit blocks are found to suppress noise.

Japanese Laid-open Patent Publication No. 2000-267752
International Publication Pamphlet No. WO00/65651

However, noise contains plural frequencies. Accordingly, if a skew value is set, noise at some frequencies may be reduced. But on the contrary noise at other frequencies may increase. That is to say, it is difficult to adjust a clock skew for noise suppression.

SUMMARY

According to an aspect, there is provided a design method for adjusting clock skews. The method includes: separating, by a computer, each of power supply currents which flow through a plurality of circuit sections that operate in synchronization with a clock signal into a plurality of frequency components; setting skew values of the clock signal which reaches the plurality of circuit sections; and performing, by the computer, by changing the skew values, repetition of calculating a combined amplitude by combining, with respect to each of the frequency components, corresponding ones of the frequency components of the power supply currents which flow through the plurality of circuit sections and finding dependence of the combined amplitude on a skew.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 illustrates an example of a sine wave function table;

FIG. 8 illustrates an example of a clock skew setting table;

FIG. 9 illustrates an example of a target frequency setting table;

FIG. 10 illustrates an example of a clock skew sweep table;

DESCRIPTION OF EMBODIMENTS

Figure 1:
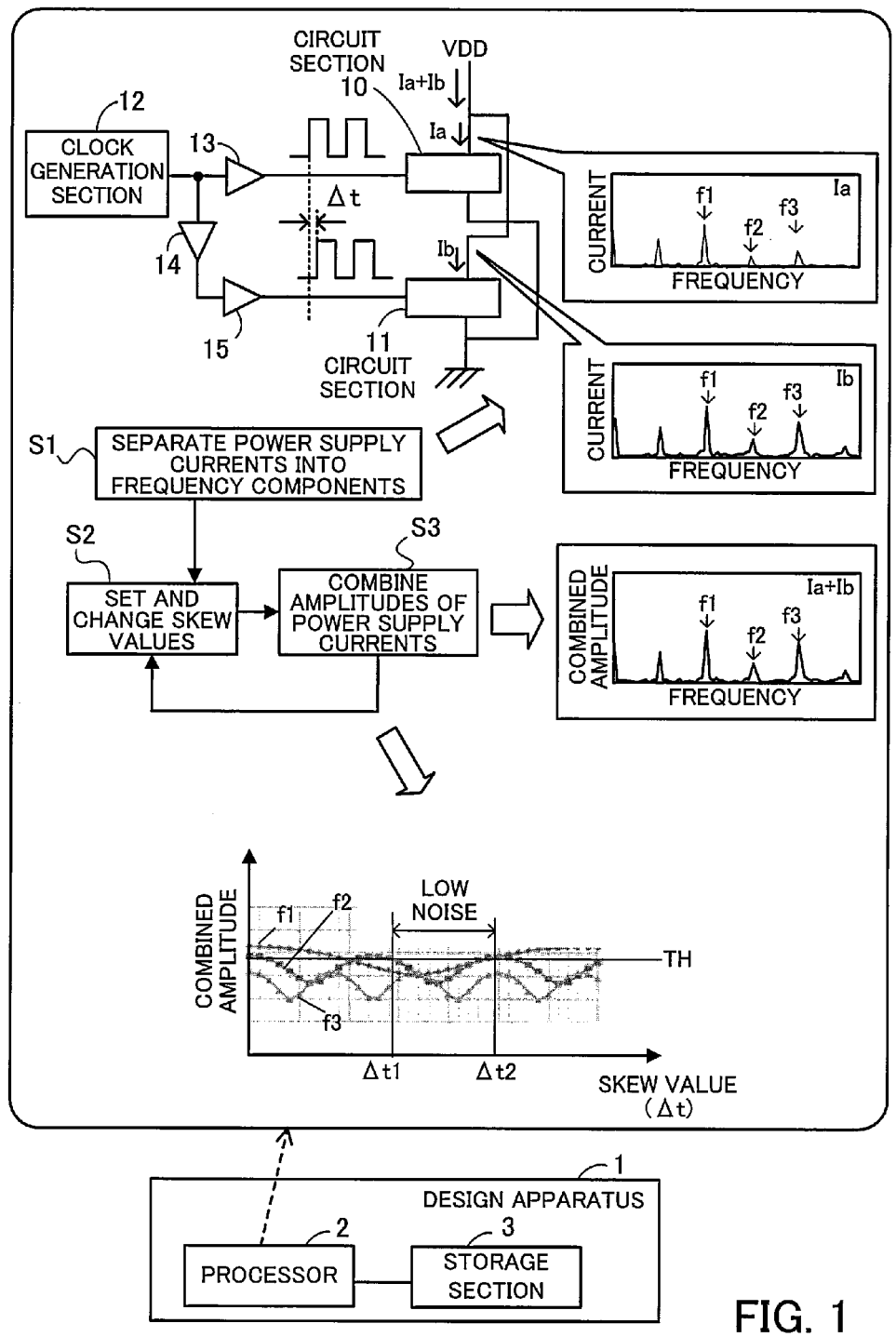
FIG. 1 illustrates examples of a design method and a design apparatus according to a first embodiment.

Embodiments will now be described with reference to the accompanying drawings, wherein like reference numerals refer to like elements throughout.

First Embodiment

FIG. 1 illustrates examples of a design method and a design apparatus according to a first embodiment.

A design apparatus 1 includes a processor 2 and a storage section 3.

The processor 2 performs the following steps on the basis of data and programs stored in the storage section 3.

The following steps are performed, for example, at the time of clock tree design in a semiconductor integrated circuit design process. FIG. 1 illustrates an example of a clock tree via which a clock signal is supplied to circuit sections 10 and 11 that operate in synchronization with the clock signal. Power supply voltage VDD is supplied to the circuit sections 10 and 11. The clock signal is generated by a clock generation section 12, is supplied to the circuit section 10 via a clock buffer 13, and is supplied to the circuit section 11 via clock buffers 14 and 15. If delays which occur in the clock signal in the clock buffers 13 and 15 are equal, then a time difference (skew) of Δt arises due to a delay which occurs in the clock buffer 14 between the time when the clock signal reaches the circuit section 10 and the time when the clock signal reaches the circuit section 11. By intentionally producing a skew, the circuit sections 10 and 11 do not operate at the same timing. This suppresses power supply noise.

As stated above, however, noise contains plural frequencies. Accordingly, if a skew value is set, noise at some frequencies may be reduced. But on the contrary noise at other frequencies may increase. That is to say, it is difficult to adjust a skew value. Therefore, with the design method according to the first embodiment the following steps are performed at the time of adjusting a clock skew. This makes it easy to adjust a skew value.

First the processor 2 separates power supply currents Ia and Ib which flow through the circuit sections 10 and 11, respectively, into frequency components (step S1). In the example of FIG. 1, the power supply currents Ia and Ib are separated into frequency components at different frequencies including f1, f2 and f3. An example of frequency separation will be described later.

Furthermore, the processor 2 sets a skew value (Δt) for a clock signal which reaches the circuit sections 10 and 11 (step S2). The processor 2 then performs repetition of combining the amplitudes at each frequency of the power supply currents Ia and Ib which flow through the circuit sections 10 and 11 (step S3) by changing a skew value to find the dependence of a combined amplitude on a skew. A skew value may be set before step S1.

In the example of FIG. 1, a combined amplitude obtained by combining the amplitudes at each frequency of the power supply currents Ia and Ib and the dependence of the combined amplitudes at the frequencies f1, f2 and f3 to be suppressed (objects of suppression) on a skew are indicated. A combined amplitude represents the magnitude of a power supply current which is a source of noise (power supply noise). By finding the dependence of a combined amplitude on a skew, a skew value by which noise at each frequency is effectively suppressed is known. As a result, it is easy to adjust a skew value.

As can be seen from the example of FIG. 1, for example, in order to make noise at the frequencies f1, f2 and f3 lower than a threshold TH, a skew value is set to a value between Δt1 and Δt2.

For example, the processor 2 uses the clock buffer 14 which produces a delay in the range of these skew values for designing a clock tree. It is easy to adjust and determine a skew value, so it is expected that design time will be reduced.

Second Embodiment

Examples of a design method and a design apparatus according to a second embodiment will now be described.

Figure 2:
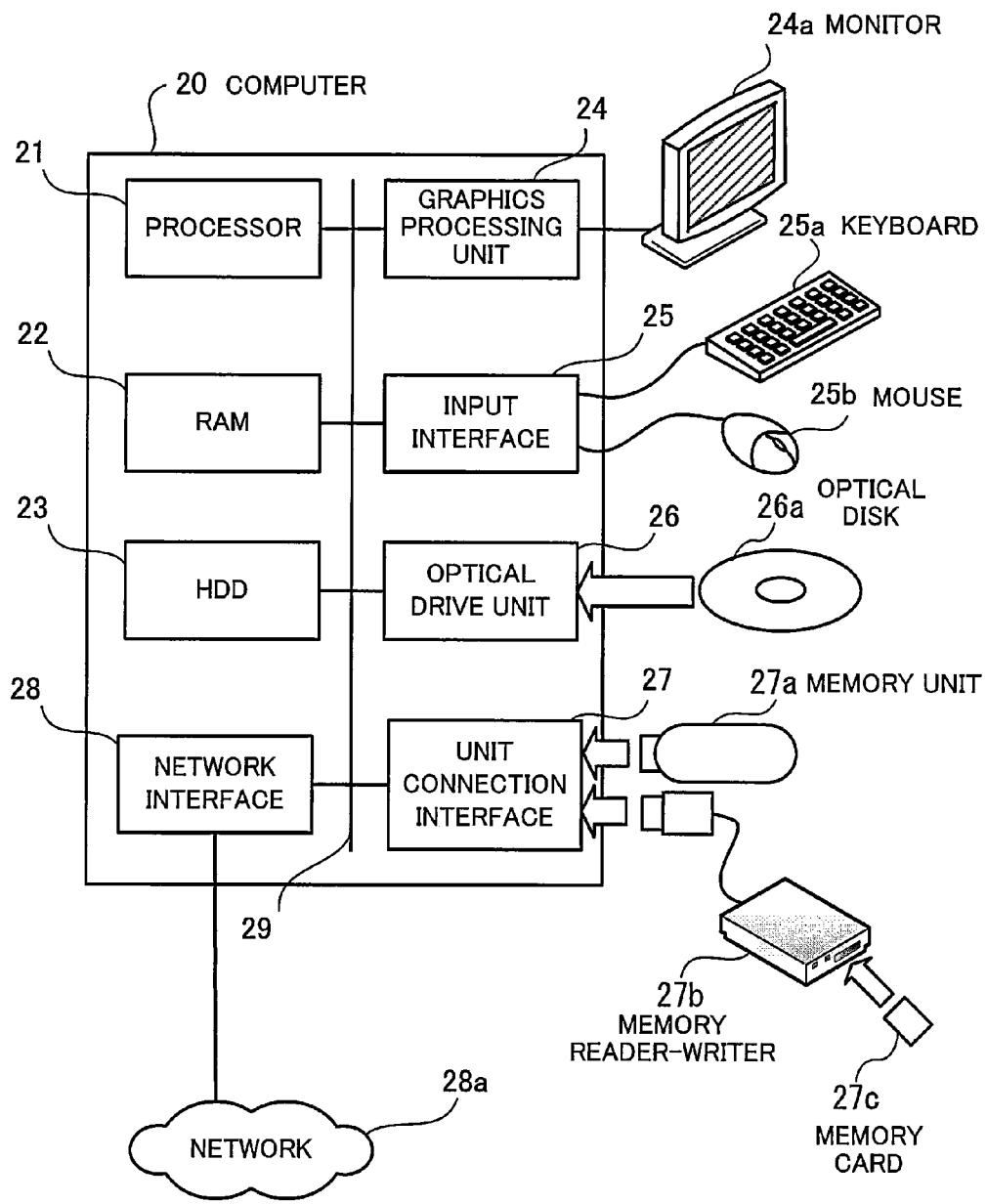
FIG. 2 illustrates an example of a design apparatus according to a second embodiment.

FIG. 2 illustrates an example of a design apparatus according to a second embodiment.

A design apparatus is, for example, a computer 20 and the whole of the computer 20 is controlled by a processor 21. A RAM (Random Access Memory) 22 and a plurality of peripheral units are connected to the processor 21 via a bus 29. The processor 21 may be a multiprocessor. The processor 21 is a CPU (Central Processing Unit), a MPU (Micro Processing Unit), a DSP (Digital Signal Processor), an ASIC (Application Specific Integrated Circuit), a PLD (Programmable Logic Device), or the like. Alternatively, the processor 21 may be a combination of two or more of a CPU, a MPU, a DSP, an ASIC, and a PLD.

The RAM 22 is used as main storage of the computer 20. The RAM 22 temporarily stores at least a part of an OS (Operating System) program or an application program executed by the processor 21. In addition, the RAM 22 stores various pieces of data which the processor 21 needs to perform a process.

The plurality of peripheral units connected to the bus 29 are a HDD (Hard Disk Drive) 23, a graphics processing unit 24, an input interface 25, an optical drive unit 26, a unit connection interface 27, and a network interface 28.

The HDD 23 magnetically writes data to and reads out data from a built-in disk. The HDD 23 is used as auxiliary storage of the computer 20. The HDD 23 stores the OS program, application programs, and various pieces of data. A semiconductor memory, such as a flash memory, may be used as auxiliary storage.

A monitor 24a is connected to the graphics processing unit 24. The graphics processing unit 24 displays an image on a screen of the monitor 24a in accordance with an instruction from the processor 21. The monitor 24a is a display using a CRT (Cathode Ray Tube), a liquid crystal display, or the like.

A keyboard 25a and a mouse 25b are connected to the input interface 25. The input interface 25 transmits to the processor 21 a signal transmitted from the keyboard 25a or the mouse 25b. The mouse 25b is an example of a pointing device and another pointing device, such as a touch panel, a tablet, a touch pad, or a track ball, may be used.

The optical drive unit 26 reads data recorded on an optical disk 26a by the use of a laser beam or the like. The optical disk 26a is a portable record medium on which recorded data can be read by the reflection of light. The optical disk 26a is a DVD (Digital Versatile Disc), a DVD-RAM, a CD-ROM (Compact Disc Read Only Memory), a CD-R(Recordable)/RW (ReWritable), or the like.

The unit connection interface 27 is a communication interface used for connecting peripheral units to the computer 20. For example, a memory unit 27a and a memory reader-writer 27b are connected to the unit connection interface 27. The memory unit 27a is a record medium having the function of communicating with the unit connection interface 27. The memory reader-writer 27b is a unit which writes data to or reads out data from a memory card 27c. The memory card 27c is a card-type record medium.

The network interface 28 is connected to a network 28a. The network interface 28 transmits data to or receives data from another computer or a communication apparatus via the network 28a.

By adopting the above hardware configuration, processing functions in the second embodiment are realized. The design apparatus 1 according to the first embodiment is also realized by the use of the same hardware that is used in the computer 20 illustrated in FIG. 2.

The computer 20 realizes the processing functions in the second embodiment by executing a program recorded in, for example, a computer-readable record medium. The program in which the contents of a process that are to be performed by the computer 20 are described is recorded in various record media. For example, the program which is to be executed by the computer 20 is stored in the HDD 23. The processor 21 loads at least a part of the program stored in the HDD 23 into the RAM 22 and executes it. Furthermore, the program which is to be executed by the computer 20 may be recorded on a portable record medium, such as the optical disk 26a, the memory unit 27a, or the memory card 27c. The program recorded on a portable record medium is installed in the HDD 23 and then is executed, under the control of, for example, the processor 21. In addition, the processor 21 may read out the program directly from a portable record medium and execute it.

(Example of Design Method (Skew Value Setting Step))

Figure 3:
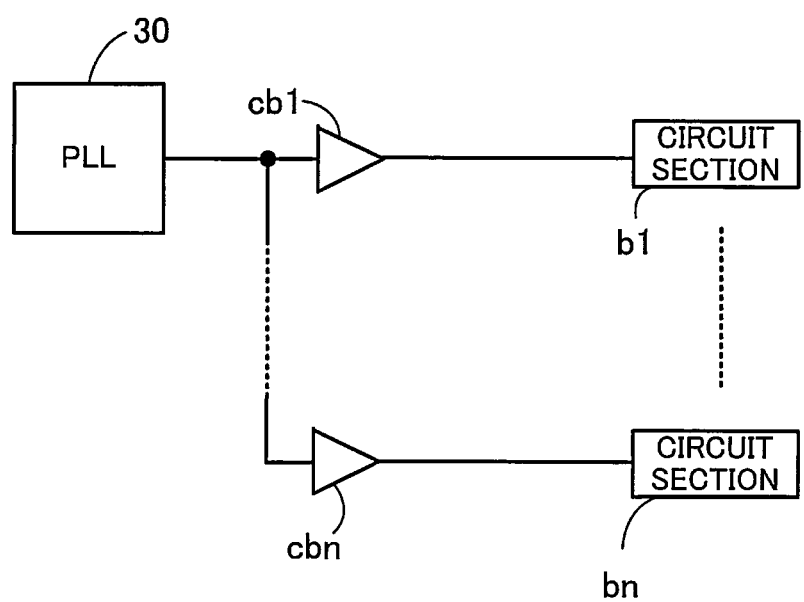
FIG. 3 illustrates an example of a clock tree to be designed.

FIG. 3 illustrates an example of a clock tree to be designed.

FIG. 3 illustrates an example of a clock tree by which a clock signal is supplied to circuit sections b1 through bn. Each of the circuit sections b1 through bn includes a flip-flop circuit or the like which operates in synchronization with a clock signal. A clock signal outputted from a PLL (Phase locked Loop) 30 is supplied to the circuit sections b1 through bn via clock buffers cb1 through cbn respectively. It is assumed that a clock tree is designed so that there will be no differences among delays produced by the clock buffers cb1 through cbn and so that skews will not be produced for clock signals which reach the circuit sections b1 through bn.

By adding clock buffers (delay elements) further to the above clock tree, clock skews for the circuit sections b1 through bn are increased. The characteristics (such as sizes) of the clock buffers added at this time are determined on the basis of skew values calculated by the following process.

Power supply voltage VDD is supplied to the circuit sections b1 through bn (not illustrated).

Figure 4:
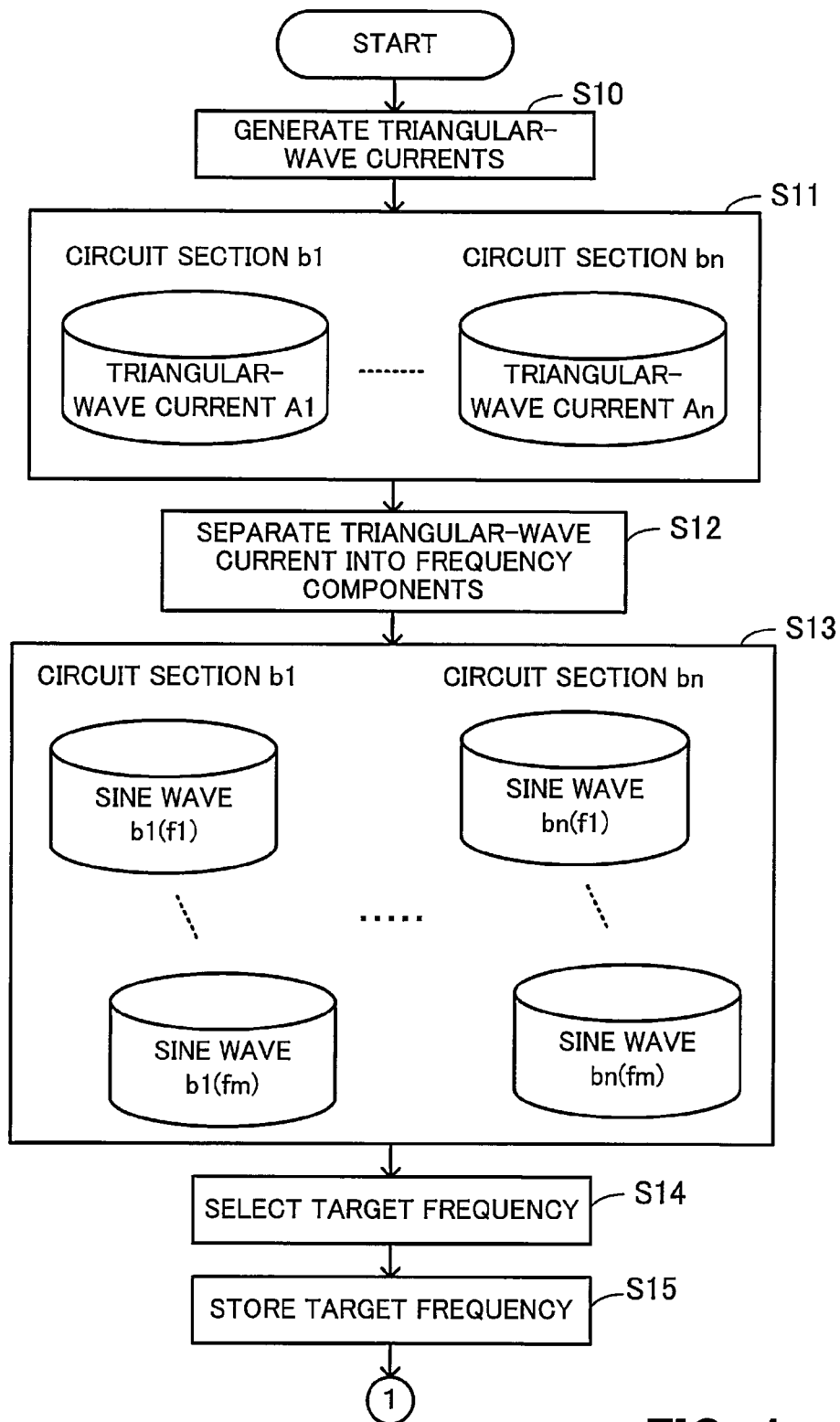
FIG. 4 is a flow chart of an example of a design method according to a second embodiment (part 1)
Figure 5:
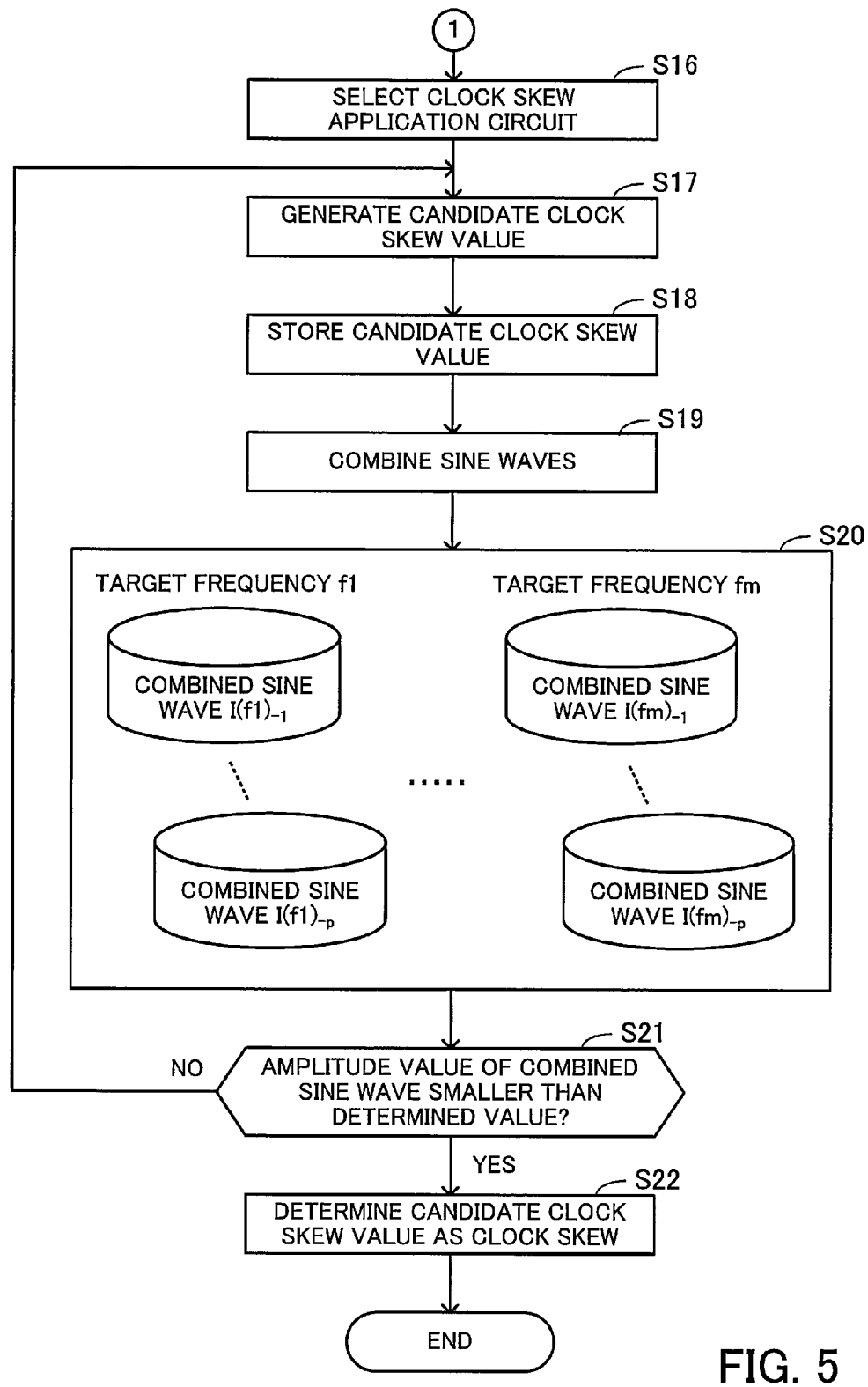
FIG. 5 is a flow chart of an example of a design method according to a second embodiment (part 2)

FIGS. 4 and 5 are flow charts of an example of a design method according to a second embodiment.

In the following description it is assumed that a clock skew is increased by increasing a delay for any of clock signals which reach the circuit sections b1 through bn illustrated in FIG. 3. The frequency, phase, amplitude, and the like of the clock signals supplied to the circuit sections b1 through bn are arbitrarily set according to the scale or operation of the circuit sections b1 through bn. Furthermore, in the following description it is assumed that the process is performed by the use of the computer 20 (design apparatus) illustrated in FIG. 2.

First, when the clock signals are supplied to the circuit sections b1 through bn, the processor 21 estimates and generates triangular-wave currents (triangular-wave currents A1 through An) which approximate to power supply currents (consumption currents) which flow through the circuit sections b1 through bn respectively (step S10).

The processor 21 stores in, for example, the RAM 22 or the HDD 23 the waveforms of the triangular-wave currents A1 through An according to the circuit sections b1 through bn (step S11).

The processor 21 reads out the triangular-wave currents A1 through An stored in the RAM 22 or the HDD 23, and separates each of the triangular-wave currents A1 through An into frequency components (step S12). In this case, a triangular-wave current is separated into a fundamental frequency component and plural harmonic frequency components at different frequencies integer times the fundamental frequency. The fundamental frequency corresponds to the frequency of the clock signals.

The processor 21 creates a database according to the circuit sections b1 through bn from a fundamental frequency component through an mth harmonic frequency component included in each of the triangular-wave currents A1 through An, and stores the database in, for example, the RAM 22 or the HDD 23 (step S13).

For example, the following sine waves are registered as frequency components of the triangular-wave current A1 which flows through the circuit section b1.

$$\text{sine wave } b1(f1) = A_{b1(f1)} \cos(\omega_1(t+t0)),$$

$$\text{sine wave } b1(f2) = A_{b1(f2)} \cos(\omega_2(t+t0)),$$

..., and $$\text{sine wave } b1(fm) = A_{b1(fm)} \cos(\omega_m(t+t0))$$

where $A_{b1(fk)}$ is the amplitude of a frequency component at a frequency fk included in the triangular-wave current A1 which flows through the circuit section b1, $\omega$ is an angular frequency, and t0 is an initial phase.

In the above example, a sine wave is used as one of methods for representing a frequency component. However, another representation method including amplitude and phase information may be used.

Next, in order to suppress noise current at a specific frequency of plural frequencies included in triangular-wave current, the processor 21 selects the specific frequency as a target frequency (step S14).

For example, in order to suppress a noise current generated especially by a third harmonic frequency of plural frequencies included in triangular-wave current, the third harmonic frequency is selected as a target frequency. The number of target frequencies is not limited to one. In order to suppress noise currents corresponding to plural specific frequencies, plural target frequencies are selected.

The processor 21 stores the target frequency in, for example, the RAM 22 or the HDD 23 (step S15).

The processor 21 selects from the circuit sections b1 through bn a circuit section (hereinafter also referred to as a clock skew application circuit) for which a delay for an arriving clock signal is increased (step S16).

The processor 21 generates a candidate clock skew value by which a clock skew is given to the clock skew application circuit (step S17), and stores the candidate clock skew value in, for example, the RAM 22 or the HDD 23 (step S18).

After that, the processor 21 changes the phases of sine waves having plural target frequencies on the basis of a candidate clock skew value according to clock skew application circuits and combines the sine-wave power supply currents which flow through the circuit sections b1 through bn according to the target frequencies. This step is repeated times the number of which corresponds to the number of the candidate clock skew values (step S19).

For example, it is assumed that when a clock signal which reaches the circuit section b1 of the circuit sections b1 through bn is considered as reference, candidate clock skew values applied to clock signals which reach the circuit sections b2 through bn are $t_{sb2}$ through $t_{sbn}$ respectively, and that a target frequency is f1.

In this case, a sine wave b1(f1) having the target frequency f1 which flows through the circuit section b1 is given by $$\text{sine wave } b1(f1) = A_{b1(f1)} \cos(\omega_1(t+t0_{b1})) \quad (1)$$

where $A_{b1(f1)}$ is amplitude and $t0_{b1}$ is an initial phase.

In addition, a sine wave b2(f1) having the target frequency f1 which flows through the circuit section b2 is given by $$\text{sine wave } b2(f1) = A_{b2(f1)} \cos(\omega_1(t+t0_{b2}+t_{sb2})) \quad (2)$$

where $A_{b2(f1)}$ is amplitude and $t0_{b2}$ is an initial phase. In this case, a phase shifts by the candidate clock skew value $t_{sb2}$.

Similarly, a sine wave bn(f1) having the target frequency f1 which flows through the circuit section bn is given by $$\text{sine wave } bn(f1) = A_{bn(f1)} \cos(\omega_1(t+t0_{bn}+t_{sbn})) \quad (3)$$

where $A_{bn(f1)}$ is amplitude and $t0_{bn}$ is an initial phase. In this case, a phase shifts by the candidate clock skew value $t_{sbn}$.

Accordingly, a combined wave (combined sine wave) I(f1) obtained by combining these sine waves is given by $$I(f1) = A_{b1(f1)}\cos(\omega_1(t+t0_{b1})) + \qquad (4)$$
$$A_{b2(f1)}\cos(\omega_1(t+t0_{b2}+t_{sb2})) + \ldots + A_{bn(f1)}\cos(\omega_1(t+t0_{bn}+t_{sbn}))$$

Actually, the method of shifting the phase of a sine wave having a target frequency and combining plural sine waves each having the target frequency obtained by shifting a phase, while adjusting the candidate clock skew values $t_{sb2}$ through $t_{sbn}$ (gradually increasing the candidate clock skew values $t_{sb2}$ through $t_{sbn}$ from a small value to a large value, for example) is adopted.

Next, the processor 21 stores combined sine waves found according to target frequencies in, for example, the RAM 22 or the HDD 23 (step S20).

If there are p candidate clock skew values for the target frequency f1, then the combined sine wave $I(f1)_{-p}$ in FIG. 5 is a combined sine wave having the target frequency f1 to which the first candidate clock skew value is assigned. Furthermore, the combined sine wave $I(f1)_{-p}$ in FIG. 5 is a combined sine wave having the target frequency f1 to which the pth candidate clock skew value is assigned.

The processor 21 then determines whether or not the value of the amplitude of a combined sine wave (value of combined amplitude) is smaller than a determined value (step S21). If the value of the amplitude of the combined sine wave (value of the combined amplitude) is smaller than the determined value, then the processor 21 proceeds to step S22. If the value of the amplitude of the combined sine wave (value of the combined amplitude) is larger than the determined value, then the process is repeated from step S17.

In step S22, the processor 21 determines the candidate clock skew value generated in step S17 as a skew value. If there are plural candidate clock skew values, then the processor 21 selects a skew value from among them on the basis of a rule described later.

An example of a triangular-wave current generated in the above step S10 will now be described.

(Example of Generating Triangular-Wave Current)

Figure 6:
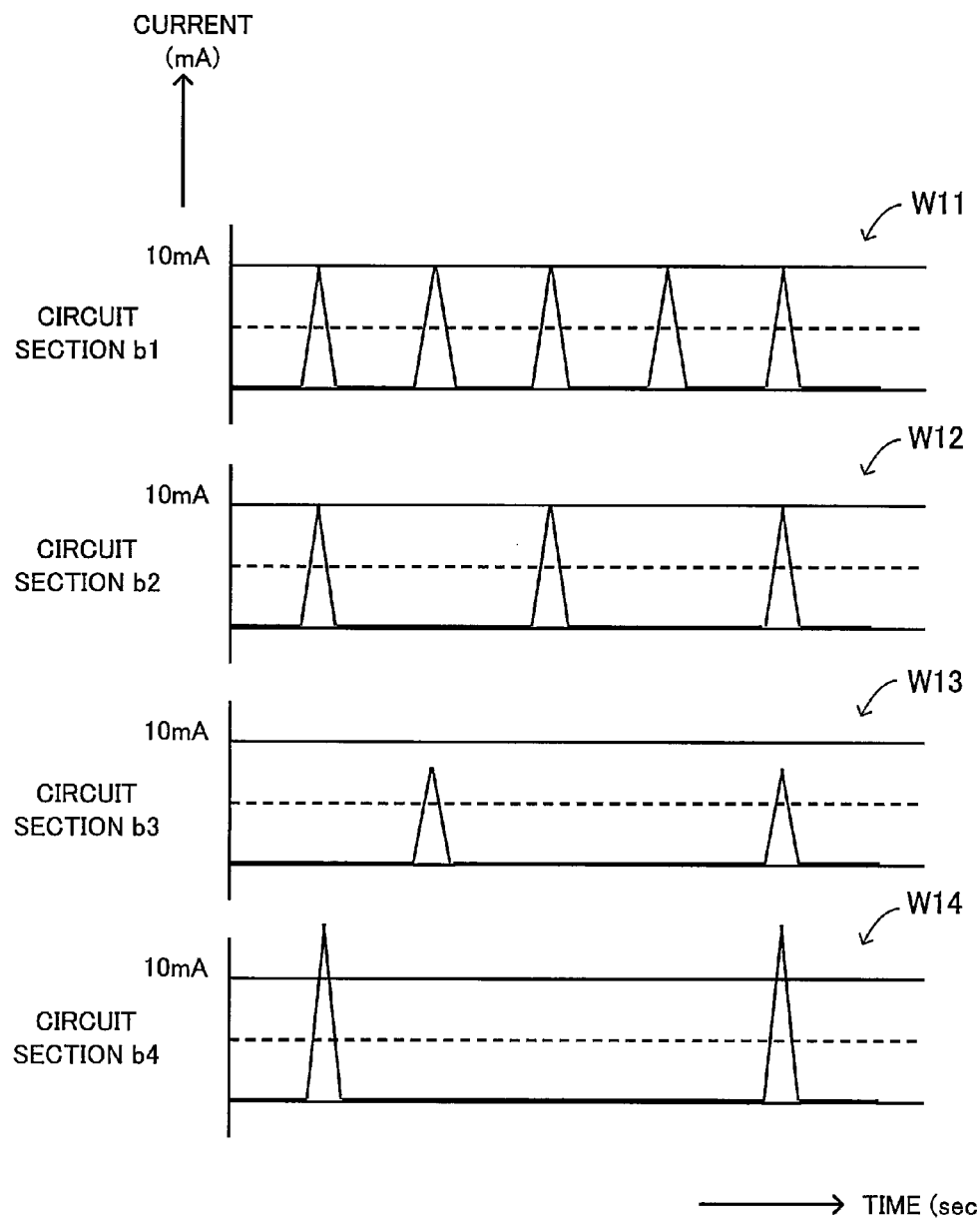
FIG. 6 illustrates an example of a triangular-wave current waveform.

FIG. 6 illustrates an example of a triangular-wave current waveform.

FIG. 6 illustrates waveforms W11 through W14 of triangular-wave currents which flow through the circuit sections b1 through b4 respectively. In FIG. 6, a horizontal axis indicates time (sec.) and a vertical axis indicates current (mA). As illustrated in FIG. 6, the triangular-wave current waveforms W11 through W14 differ in frequency or current amount according to the scale of the circuit sections b1 through b4.

A triangular-wave current waveform is generated on the basis of average consumption current and operating frequency of each circuit section.

An example of the frequency separation in step S12 will now be described.

(Example of Frequency Separation)

A triangular-wave current is separated into frequency components by the use of, for example, the Fourier series expression given by $$f(t) = \frac{A\tau}{2T} + \frac{A\tau}{T}\sum_{x=1}^{\infty}\left\{\frac{\sin\left(\frac{x\pi\tau}{2T}\right)}{\left(\frac{x\pi\tau}{2T}\right)}\right\}^2 \cos x\omega_0 t \qquad (5)$$

where A is amplitude, T is a period, τ is waveform width (pulse width), x is an order number (order number of a harmonic), and $\omega_0$ is an initial angular frequency.

Furthermore, the first term Aτ/2T and the second term in expression (5) indicate a DC (Direct Current) component and a frequency component respectively. In this embodiment a frequency spectrum is used as an evaluation index, so the second term of the right side in expression (5), which indicates a frequency component, is used. (Aτ/T)·{(sin(xπτ/2T))/(xπτ/2T)}² in the second term in expression (5) indicates the amplitude (constant) and cos $x\omega_0 t$ indicates the frequency.

FIG. 7 illustrates an example of a sine wave function table.

A sine wave function table T1 indicates a sine wave function corresponding to a triangular-wave current at a harmonic frequency which flows through each circuit section and is stored in, for example, the RAM 22 or the HDD 23. In FIG. 7, $A_{bk(fb)}$ (k=1 to n) indicates the amplitude of a triangular-wave current at a frequency fb which flows through a circuit section bk and $t0_{bk}$ indicates an initial phase for the circuit section bk.

An example of the target frequency selection in step S14 will now be described.

(Example of Target Frequency Selection)

Selecting a harmonic frequency as a target frequency from among plural harmonic frequencies included in a triangular-wave current is determined on the basis of the following indexes.

(1) The processor 21 sets as a target frequency the same harmonic frequency included in a triangular-wave current which flows through each circuit section. For example, if a frequency fj indicated in FIG. 7 is included in all triangular-wave currents which flow through circuit sections b1, b2, b3, and bn, then the peak of a current at the frequency fj is considered to be high. Accordingly, the processor 21 sets the frequency j as a target frequency.

The processor 21 sets in this way as a target frequency a frequency, of plural frequencies obtained by separating a triangular-wave current which flows through each circuit section into frequency components, included in triangular-wave currents which flow through plural circuit sections (at least two circuit sections) in the same time period. For example, the frequencies f1, f2 and f3 indicated in FIG. 1 are included in the power supply currents Ia and Ib which flow through the circuit sections 10 and 11 respectively, so they are set as target frequencies. As a result, noise at a specific frequency at which noise current is considered to be strong is reduced.

(2) Frequency bands to be considered as EMI (Electro Magnetic Interference) standards are set for final products or semiconductor elements. Accordingly, the processor 21 sets as target frequencies a fundamental frequency and a harmonic frequency which are included in a triangular-wave current that flows through each circuit section and which are included in a frequency band required by an EMI standard.

An example of the clock skew application circuit selection in step S16 will now be described.

(Example of Clock Skew Application Circuit Selection)

The processor 21 selects a clock skew application circuit on the basis of, for example, consumption current or a timing constraint.

If the processor 21 selects a clock skew application circuit on the basis of consumption current, then the processor 21 selects as clock skew application circuits k (k=1, 2, . . . )

circuit sections selected from among the circuit sections b1 through bn in descending order of peak of triangular-wave current.

Furthermore, if the processor 21 selects a clock skew application circuit on the basis of a timing constraint, then the processor 21 selects as clock skew application circuits k circuit sections selected from among the circuit sections b1 through bn in ascending order of severity of a constraint on setup and hold timing at the time of clock signals c1 through cn being supplied to the circuit sections b1 through bn respectively.

A clock skew given to a circuit section can be set within a range in which setup and hold timing of the circuit section is satisfied, so an allowable clock skew value can be made large for a circuit section for which a constraint on setup and hold timing is lax.

If the number k of clock skew application circuits is large, a clock skew dispersion effect is evaluated closely within an allowed timing constraint. It is desirable to increase or decrease the value of k according to circumstances.

As has been described, the processor 21 preferentially selects as a clock skew application circuit a circuit section of plural circuit sections in which the peak of a consumption current (power supply current) is higher than the peaks of consumption currents in the other circuit sections or a circuit section of plural circuit sections for which a constraint on setup and hold timing is laxer than constraints on setup and hold timing for the other circuit sections. This makes it possible to properly select a circuit section to which a clock skew is to be given.

An example of the candidate clock skew value generation in step S17 will now be described.

(Example of Candidate Clock Skew Value Generation)

The maximum value of a skew value is a value prescribed in a timing constraint (timing constraint value) on a circuit section. The processor 21 considers a value obtained by dividing the maximum value (value obtained by equally dividing the maximum value, for example) as a sweep step size and generates plural candidate clock skew values.

FIG. 8 illustrates an example of a clock skew setting table.

A clock skew setting table T2 is used for generating a candidate clock skew value, and is stored in, for example, the RAM 22 or the HDD 23.

The clock skew setting table T2 includes Clock Skew Applied/Non-applied, Maximum Clock Skew Value, and Clock Skew Sweep Step items. Constraints on setup and hold timing differ among different clock skew application circuits, so maximum clock skew values given also differ among different clock skew application circuits.

The circuit section b1 is a clock skew application circuit. A maximum clock skew value and a clock skew sweep step for the circuit section b1 are 500 ps and 50 ps respectively. Accordingly, candidate values of a clock skew given to the circuit section b1 are 50, 100, 150, . . . , 450, and 500 ps.

The peak of a power supply current in the circuit section b3 is lower than the peaks of power supply currents in the other circuit sections b1, b2, and bn or a timing constraint on the circuit section b3 is severer than timing constraints on the other circuit sections b1, b2, and bn. Accordingly, a clock skew is not applied to the circuit section b3.

As has been described, the processor 21 considers as a maximum value a value prescribed in a constraint on setup and hold timing for a circuit section and generates candidate skew values by multiplying a step value obtained by dividing the maximum value by a determined number and an integer together. This makes it possible to generate plural proper candidate clock skew values within the constraint on setup and hold timing for the circuit section.

An example of the sine wave combining in step S19 will now be described by the use of the example of the sine wave function table T1 illustrated in FIG. 7.

(Example of Sine Wave Combining)

It is assumed that in the sine wave function table T1 the processor 21 sets the frequencies f2, f3, and fj as target frequencies at which noise current is to be suppressed.

In addition, it is assumed that the processor 21 selects the circuit sections b1, b2, and bn as clock skew application circuits from among the circuit sections b1 through bn indicated in the sine wave function table T1 and that the processor 21 assigns candidate clock skew values $t_{sb1}$, $t_{sb2}$, and $t_{sbn}$ to the circuit sections b1, b2, and bn, respectively, while changing their values.

In this case, combined sine waves I(f2), I(f3), and I(fj) having the target frequencies f2, f3, and fj, respectively, are given by:

$$I(f2) = A_{b1(f2)} \cdot \cos\omega_2(t + t0_{b1} + t_{sb1}) + A_{b2(f2)} \cdot \cos\omega_1(t + t0_{b2} + t_{sb2}) \quad (6)$$

$$I(f3) = A_{b1(f3)} \cdot \cos\omega_3(t + t0_{b1} + t_{sb1}) + \quad (7)$$
$$A_{b3(f3)} \cdot \cos\omega_4(t + t0_{b3}) + A_{bn(f3)} \cdot \cos\omega_1(t + t0_{bn} + t_{sbn})$$

$$I(fj) = A_{b1(fj)} \cdot \cos\omega_j(t + t0_{b1} + t_{sb1}) + A_{b2(fj)} \cdot \cos\omega_k(t + t0_{b3} + t_{sb2}) + \quad (8)$$
$$A_{b3(fj)} \cdot \cos\omega_1(t + t0_{b3}) + A_{bn(fj)} \cdot \cos\omega_m(t + t0_{bn} + t_{sbn})$$

FIG. 9 illustrates an example of a target frequency setting table.

A target frequency setting table T3 is used for variably setting a target frequency with x as an order number, and is stored in, for example, the RAM 22 or the HDD 23.

In the example of the target frequency setting table T3 illustrated in FIG. 9, a target frequency is increased in order from 30 MHz to 60 MHz, . . . and fmax which equal integer times 30 MHz.

FIG. 10 illustrates an example of a clock skew sweep table.

A clock skew sweep table T4 is used for variably setting a candidate clock skew value with y as a sweep step number, and is stored in, for example, the RAM 22 or the HDD 23.

In the example of the clock skew sweep table T4 illustrated in FIG. 10, a candidate clock skew value is increased in order from 0 ps to 50 ps, . . . , and tsmax with a sweep step as 50 ps.

Figure 11:
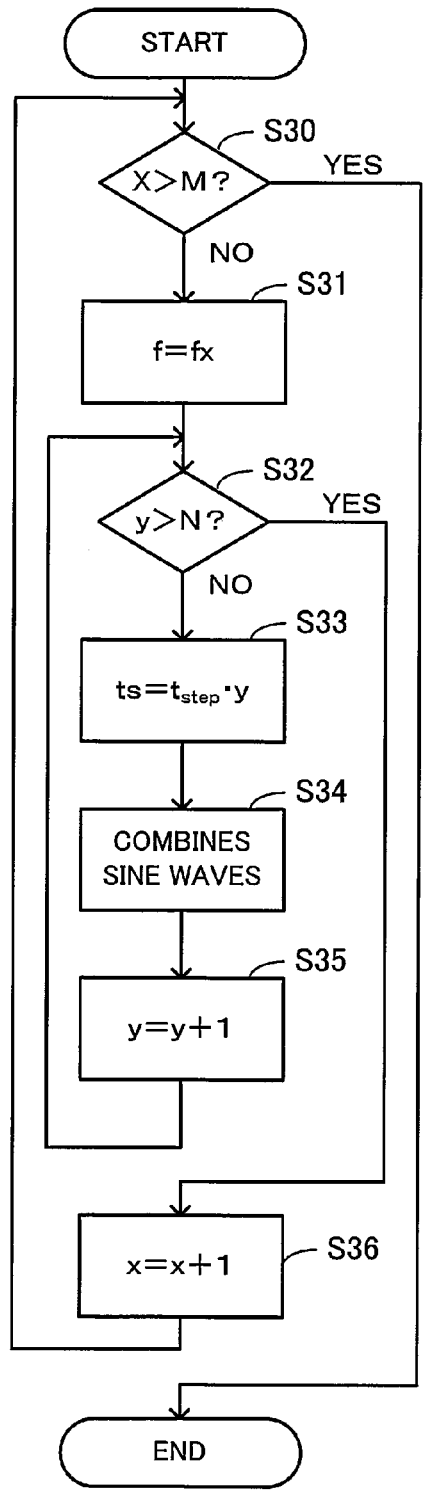
FIG. 11 is a flow chart of an example of variably setting a target frequency and a candidate clock skew value at the time of sine wave combining.

FIG. 11 is a flow chart of an example of variably setting a target frequency and a candidate clock skew value at the time of sine wave combining.

The processor 21 determines whether or not an order number x is larger than M (step S30). If the order number x is not larger than M, then the processor 21 proceeds to step S31. If the order number x is larger than M, then the process ends.

In step S31, the processor 21 uses the target frequency setting table T3 for setting a target frequency fx.

After that, the processor 21 determines whether or not a sweep step number y is larger than N (step S32). If the sweep step number y is not larger than N, then the processor 21 proceeds to step S33. If the sweep step number y is larger than N, then the processor 21 proceeds to step S36.

In step S33, the processor 21 uses the clock skew sweep table T4 for generating a candidate clock skew value. A candidate clock skew value ts is calculated by $$ts = t \times y$$

where t is a sweep step size.

After that, the processor 21 combines sine waves each having the target frequency fx according to candidate clock skew values (step S34) and increments the sweep step number y (y=y+1) (step S35). The processor 21 then repeats the process from step S32.

In step S36, the processor 21 increments the order number x (x=x+1). After that, the processor 21 repeats the process from step S30.

Figure 12:
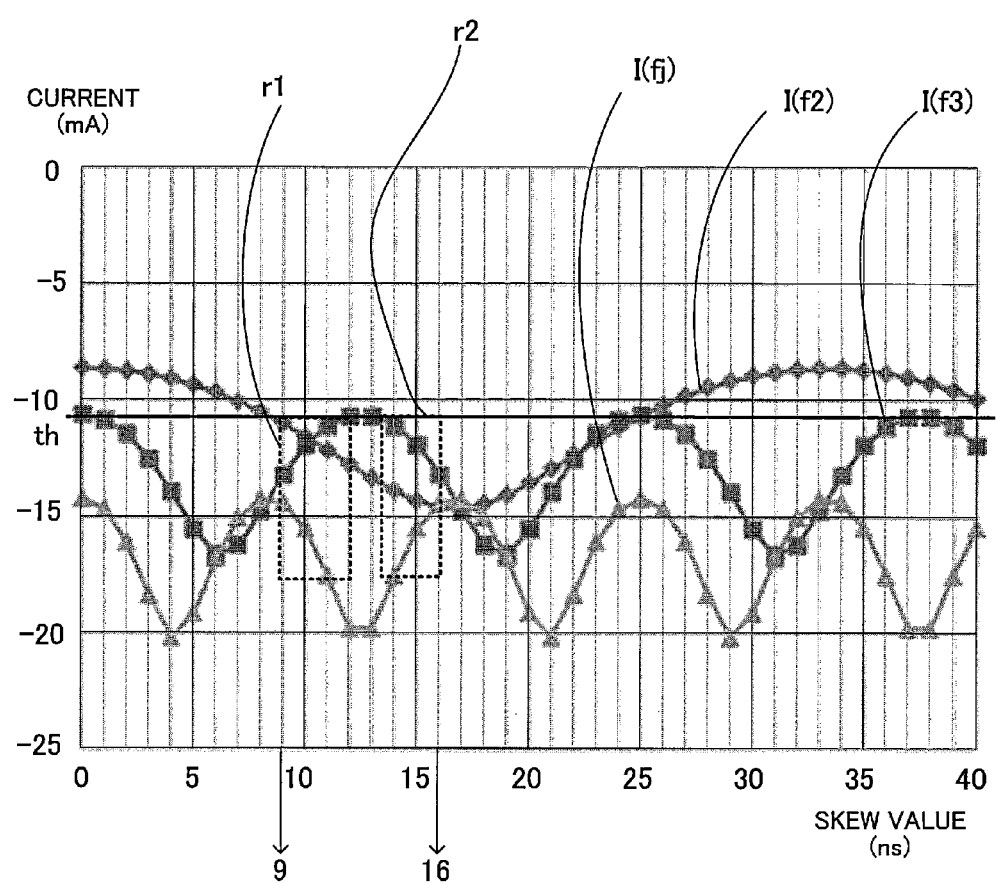
FIG. 12 illustrates an example of a combined sine wave.

FIG. 12 illustrates an example of a combined sine wave.

In FIG. 12, a horizontal axis indicates a skew value (ns) and a vertical axis indicates current (amplitude of a combined sine wave) (mA). FIG. 12 illustrates a change in the amplitude of each of the combined sine waves I(f2), I(f3), and I(fj) which are given by expressions (6) through (8), respectively, and which are obtained by combining sine waves while sweeping candidate clock skew values.

I(f2) indicates the combined sine wave having the target frequency f2, I(f3) indicates the combined sine wave having the target frequency f3, and I(fj) indicates the combined sine wave having the target frequency fj.

For the sake of simplicity it is assumed that the candidate clock skew value $t_{sb1}$ given to the circuit section b1 is fixed. In addition, it is assumed that the candidate clock skew values $t_{sb2}$ and $t_{sbn}$ given to the circuit sections b2 and bn, respectively, are swept with the same sweep step size. In order to arbitrarily set the candidate clock skew values $t_{sb1}$, $t_{sb2}$, and $t_{sbn}$ individually, step S33 of FIG. 11 is performed a predetermined number of times.

As has been described, after the processor 21 calculates combined sine waves for all target frequencies, the processor 21 selects a skew value to be actually set from among candidate clock skew values by which the amplitude values of the combined sine waves are smaller than or equal to, for example, a threshold th.

In FIG. 12, for example, it is assumed that the amplitude values of the combined sine waves are smaller than or equal to the threshold th in regions r1 and r2 and that the regions r1 and r2 are within clock skew criteria. Accordingly, the processor 21 selects a candidate clock skew value in the region r1 or r2 as a skew value to be actually set. However, the region r1 or r2 includes plural candidate clock skew values.

In such a case, the processor 21 considers a timing constraint on each circuit section and selects a small candidate clock skew value within the clock skew criteria for a clock skew application circuit on which a timing constraint is severe. In the example of FIG. 12, the minimum value of a candidate clock skew value in the region r1 is 9 ns. Therefore, the processor 21 adopts the skew value 9 ns.

Furthermore, if priority is given to control of the intensity of current, then the processor 21 selects a candidate clock skew value within the clock skew criteria at which an amplitude value is small. In the example of FIG. 12, a candidate clock skew value in the region r2 at which an amplitude value is small is 16 ns. Therefore, the processor 21 adopts the skew value 16 ns.

As has been described, if there are plural candidate clock skew values within clock skew criteria, then the processor 21 adopts as a skew value the smallest candidate clock skew value within the clock skew criteria. By doing so, a margin is secured for a timing constraint on a circuit section. This makes it possible to reduce noise while realizing stable operation of the circuit section.

Alternatively, if there are plural candidate clock skew values within clock skew criteria, then the processor 21 adopts as a skew value a candidate clock skew value within the clock skew criteria at which the amplitude of a combined sine wave is smallest. This makes it possible to satisfy a constraint on the intensity of noise current.

On the basis of a skew value adopted in this way, a clock buffer is added to a clock tree to increase a clock skew.

As has been described in the foregoing, with the design method and the design apparatus according to this embodiment a skew value at which noise at each frequency is suppressed is known by finding the dependence of combined amplitude on a skew. That is to say, a frequency at which noise is suppressed and a frequency at which noise grows are clearly evaluated according to a set skew value. As a result, a skew value is easily adjusted. This makes it possible to perform highly accurate skew value setting which enables suppression of noise at a desired frequency and to reduce TAT (Turn Around Time).

The design method, the design apparatus, and the program according to the invention have been described on the basis of the embodiments. However, these are simple examples and the invention is not limited to them.

According to the disclosed design method, design apparatus, and program, a clock skew is easily adjusted.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A design method for adjusting clock skews, the method comprising:

generating, by a clock generator, a clock signal;

supplying, by a plurality of clock buffers, the clock signal to a plurality of circuit sections that operate in synchronization with the clock signal;

separating, by a processor, each of triangular-wave currents which flow through the plurality of circuit sections into a plurality of frequency components;

setting skew values of the clock signal which reaches the plurality of circuit sections; and performing, by the processor, by changing the skew values, repetition of calculating a combined amplitude by combining, with respect to each of the frequency components, corresponding ones of the frequency components of the triangular-wave currents which flow through the plurality of circuit sections and finding dependence of the combined amplitude on a skew, wherein a skew value at the time of a first combined amplitude calculated by combining the frequency components of the triangular-wave currents corresponding to a frequency component to be suppressed among the plurality of frequency components being smaller than a first value is selected to design a clock tree;

wherein the processor obtains plural harmonic frequencies by separating the triangular-wave currents which flow through the circuit sections, selects a target frequency having overlapping frequency bands in a same time period, from among the plural harmonic frequencies, and combines a sine-wave of the triangular-wave currents according to the target frequency.

2. The design method according to claim 1, wherein when the skew value at the time of the first combined amplitude being smaller than the first value is provided in plurality, a smallest skew value or a skew value at which the first combined amplitude is smallest is selected.

3. The design method according to claim 1, wherein the skew values are preferentially applied to the clock signal supplied to first circuit sections or second circuit sections of the plurality of circuit sections, in the first circuit sections peaks of the triangular-wave currents being higher than peaks of the triangular-wave currents in other circuit sections, for the second circuit sections constraints on setup and hold timing being laxer than constraints on setup and hold timing for other circuit sections.

4. A design apparatus comprising:
a clock generator which generates a clock signal;
a plurality of clock buffers which supply the clock signal to a plurality of circuit sections that operate in synchronization with the clock signal; and
a processor which performs a procedure including:
at the time of adjusting clock skews,
separating each of triangular-wave currents which flow through the plurality of circuit sections into a plurality of frequency components;
setting skew values of the clock signal which reaches the plurality of circuit sections; and
performing, by changing the skew values, repetition of calculating a combined amplitude by combining, with respect to each of the frequency components, corresponding ones of the frequency components of the triangular-wave currents which flow through the plurality of circuit sections and finding dependence of the combined amplitude on a skew,
wherein a skew value at the time of a first combined amplitude calculated by combining the frequency components of the triangular-wave currents corresponding to a frequency component to be suppressed among the plurality of frequency components being smaller than a first value is selected to design a clock tree;
wherein the processor obtains plural harmonic frequencies by separating the triangular-wave currents which flow through the circuit sections, selects a target frequency having overlapping frequency bands in a same time period, from among the plural harmonic frequencies, and combines a sine-wave of the triangular-wave currents according to the target frequency.

5. The design apparatus according to claim 4, wherein when the skew value at the time of the first combined amplitude being smaller than the first value is provided in plurality, a smallest skew value or a skew value at which the first combined amplitude is smallest is selected.

6. The design apparatus according to claim 4, wherein the skew values are preferentially applied to the clock signal supplied to first circuit sections or second circuit sections of the plurality of circuit sections, in the first circuit sections peaks of the triangular-wave currents being higher than peaks of the triangular-wave currents in other circuit sections, for the second circuit sections constraints on setup and hold timing being laxer than constraints on setup and hold timing for other circuit sections.

7. A computer-readable, non-transitory record medium storing a program that causes a computer to perform a process comprising:
generating a clock signal from a clock generator;
supplying the clock signal to a plurality of circuit sections that operate in synchronization with the clock signal from a plurality of clock buffers;
at the time of adjusting clock skews,
separating each of triangular-wave currents which flow through the plurality of circuit sections into a plurality of frequency components;
setting skew values of the clock signal which reaches the plurality of circuit sections; and
performing, by changing the skew values, repetition of calculating a combined amplitude by combining, with respect to each of the frequency components, corresponding ones of the frequency components of the triangular-wave currents which flow through the plurality of circuit sections and finding dependence of the combined amplitude on a skew,
wherein a skew value at the time of a first combined amplitude calculated by combining the frequency components of the triangular-wave currents corresponding to a frequency component to be suppressed among the plurality of frequency components being smaller than a first value is selected to design a clock tree;
wherein the process obtains plural harmonic frequencies by separating the triangular-wave currents which flow through the circuit sections, selects a target frequency having overlapping frequency bands in a same time period, from among the plural harmonic frequencies, and combines a sine-wave of the triangular-wave currents according to the target frequency.

8. The computer-readable, non-transitory record medium according to claim 7, wherein when the skew value at the time of the first combined amplitude being smaller than the first value is provided in plurality, a smallest skew value or a skew value at which the first combined amplitude is smallest is selected.

9. The computer-readable, non-transitory record medium according to claim 7, wherein the skew values are preferentially applied to the clock signal supplied to first circuit sections or second circuit sections of the plurality of circuit sections, in the first circuit sections peaks of the triangular-wave currents being higher than peaks of the triangular-wave currents in other circuit sections, for the second circuit sections constraints on setup and hold timing being laxer than constraints on setup and hold timing for other circuit sections.

* * * * *